Sept. 7, 1965     J. K. BARRY     3,204,680
STAND-OFF FOR RETRACTABLE SCREW FASTENER
Original Filed July 8, 1960
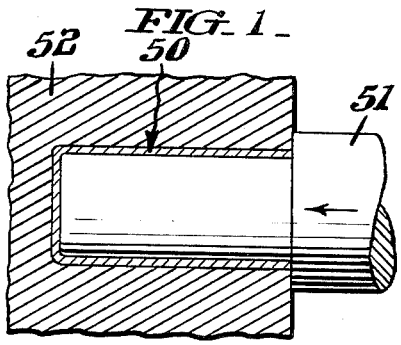
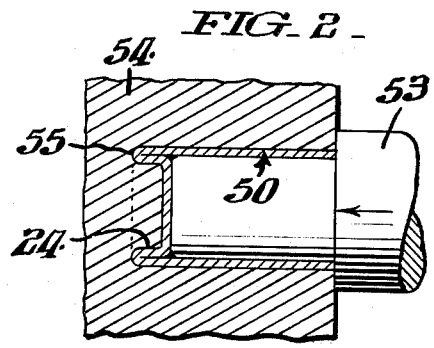
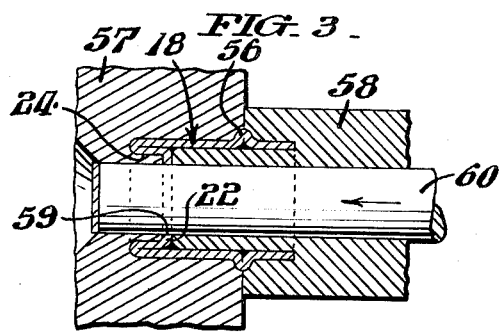
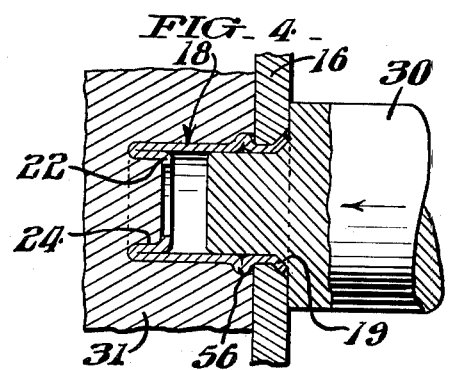
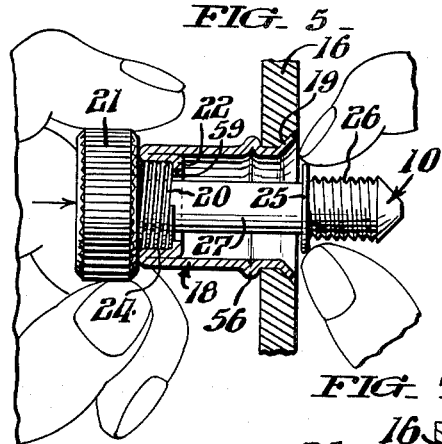
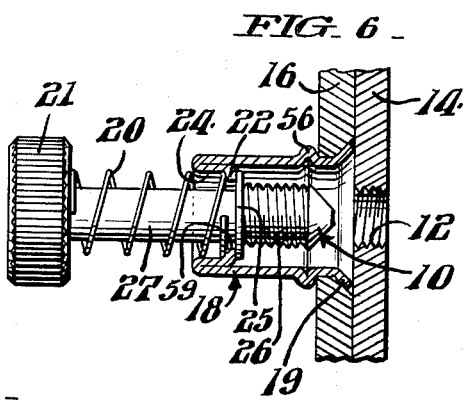
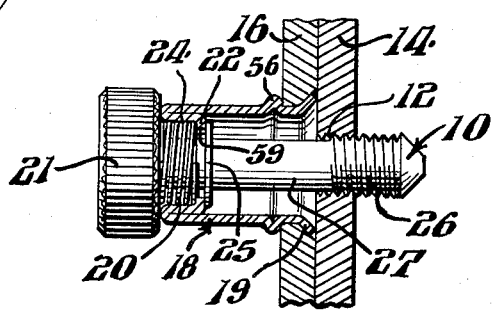
INVENTOR.
John K. Barry,
BY
Paul & Paul
ATTORNEYS.

United States Patent Office 3,204,680
Patented Sept. 7, 1965

3,204,680
STAND-OFF FOR RETRACTABLE SCREW FASTENER
John K. Barry, Springfield, Pa., assignor to South Chester Corporation, Lester, Pa., a corporation of Delaware
Continuation of application Ser. No. 41,536, July 8, 1960. This application Feb. 4, 1963, Ser. No. 256,078
3 Claims. (Cl. 151—69)

This application is a continuation of a now abandoned prior, copending application, Serial Number 41,536, filed July 8, 1960, by the inventor, John K. Barry.

This invention relates to a retractable screw fastener.

A retractable screw fastener is a fastening device employed to secure removably a component part to a master unit. In a typical case, the component part may be a panel and the master unit may be a cabinet or main frame. The retractable screw fastener is employed to secure the panel to the cabinet or frame in such manner that when the screw is retracted from the threaded hole in the frame to free the panel from the frame, the screw is retained by the panel.

The principal components of a retractable screw fastener are a screw, a stand-off bushing and a retainer. The present invention is particularly applicable, however, to a retractable screw fastener having, in addition to the three major components just mentioned, a spring for spring loading the screw so that when the screw is retracted from the tapped hole in the panel, the threaded portion of the screw is retained within the stand-off bushing, thus permitting movement of the removable panel sidewise with respect to the main frame, without scratching the main frame or damaging the threads of the screw.

My invention will be best understood from a consideration of the following detailed description of a preferred embodiment illustrated in the drawings in which:

FIG. 1 illustrates an early step in the drawing of the stand-off;

FIG. 2 illustrates a succeeding step in the forming of the stand-off, comprising a reverse drawing;

FIG. 3 illustrates final steps in the forming of the stand-off, in which the stand-off is squeezed from both ends to form an annular outwardly-protruding ring, and an axial hole is punched in the recessed end;

FIG. 4 illustrates one manner in which the end of the stand-off is flared, to retain the stand-off in the panel;

FIG. 5 illustrates the manner of placing the retainer on the screw;

FIG. 6 illustrates the retractable screw in retracted position; and

FIG. 7 illustrates the retractable screw in the position which it occupies when fully screwed into the main frame or other member.

In describing the preferred embodiment of the invention illustrated in the drawings, specific terminology has been resorted to for the sake of clarity. However, it is not the intention to be limited to the specific terms so selected, and it is to be understood that each specific term includes all technical equivalents which operate in a similar manner to accomplish a similar purpose.

It will be convenient to refere first to FIG. 7 which shows a retractable screw 10, of stainless steel or other suitable metal, screwed into a tapped hole 12 in a main frame 14, thereby to hold a panel 16 firmly against the main frame 14. A stand-off 18, of stainless steel or other suitable metal, is firmly secured in panel 16 by the flared inner edge 19 of the stand-off. A compression spring 20, of stainless steel, is compressed by head 21 of the screw 10 against a flange 22 of a re-entrant recess 24 of the stand-off. A retaining ring 25, of steel or plastic, appears in FIG. 7 against the other side of flange 22, but the retainer ring is free to move along the non-threaded throat 27 of screw 10 and may take up any position on the throat between flange 22 and main frame 14, or between the flange 22 and the threads 26 if the threaded portion of the screw is not completely embedded in the main frame.

FIG. 6 illustrates the spring-loaded retractable screw fastener in retracted position. Threaded portion 26 of screw 10 has been unscrewed from the tapped hole 12 in main frame 14 and the spring 20, which was fully compressed in FIG. 7, has expanded causing head 21 of the screw 10 to move away from the stand-off 18 and causing the threaded portion 26 of screw 10 to be withdrawn within the stand-off 18. It will be seen that when the retractable screw fastener is in retracted position, as shown in FIG. 6, the panel 16 may be moved laterally relative to the main frame 14 without damage to the threaded portions of the screw or scratching of the main frame. Also, the screw is prevented from rattling around while the panel 16 is being moved.

FIGS. 4 and 5 illustrate the manner in which the spring-loaded retractable screw fastener is assembled. As shown in FIG. 4, stand-off 18 is first inserted through a hole which has been punched or drilled in panel 16 and countersunk. A punch 30 and backup tool 31 are then employed to flare the inner edge 19 of the stand-off 18, thereby to secure the stand-off 18 in the panel 16. Spring 20 is sliped over the shank of screw 10 and the screw is then inserted into the stand-off 18. Using, for example, the left hand, as illustrated in FIG. 5, the screw is pressed inwardly toward the panel 16 causing spring 20 to be compressed in the re-entrant recess 24 and causing the threaded portion 26 of the screw 10 to protrude beyond the panel 16. The retainer 25 is then passed over the threaded portion 26, as by the right hand, using a rotary spiral motion. When the retainer arrives at the smaller-diameter non-threaded portion 27, it is captive between the threaded portion 26 of the screw and the inward flange 22 of the recess 24.

The stand-off 18 may be preferably made by a method believed to be novel. Stated briefly, according to my method, stand-off 18 is stamped in a series of steps, from an original flat piece of sheet steel, or other metal of desired thickness, for example, 0.018 inch thick.

Stated in somewhat greater detail, my method comprises first drawing the flat piece of sheet steel or other metal into a plane cup, identified in FIG. 1 by the reference number 50. In FIG. 1, the drawing is illustrated as being accomplished by die parts 51 and 52, but this is, of course, merely illustrative of one means for drawing the cup 50. Cup 50 may, for example, have a depth of 0.420" and an outside diameter of 0.250". The next step is to reverse draw to form the re-entrant recess 24. One means for doing this is illustrated in FIG. 2 where the recess 24 is formed by means of the die parts 53 and 54. The die part 54 has an annular recess 55 into which the wall of the cup 50 is forced by the larger-diameter rearward portion of die part 53, thereby to form the recessed portion 24. The next step is to squeeze the cup from both ends to form the external annular flange 56. One means for accomplishing this is illustrated in FIG. 3 in which die parts 57 and 58 mate together in the fashion illustrated. Die part 57 has the configuration readily identified by the cross-hatch lines which slope downwardly from right to left, while die part 58 has the configuration identified by the cross-hatch lines which slope downwardly from left to right. As a final step, a hole 59 is punched in the floor of the recess 24, as by the punch 60.

The location of the annular flange 56 relative to the flared end of the stand-off 18 is dependent upon the thickness of the panel 16 into which the stand-off 18 is to be inserted. The flange 56 controls the depth to which the to-be-flared end of the stand-off is inserted into the drilled or punched hole in panel 16, and after flaring the flange 56 assists in holding the stand-off firmly in the panel.

While the preferred embodiment of this invention has been described in some detail, it will be obvious to one skilled in the art that various modifications may be made without departing from the invention as hereinafter claimed.

Having thus described my invention, I claim:

1. A retractable screw fastener for detachably connecting two structural members together, said fastener comprising
a retractable stud having
   (a) threads of a first diameter located at one end for engaging the second structural member when the stud extends through a bore in the first structural member,
   (b) a head located at the end of the stud opposite the threads, said head being larger in diameter than the threads and having a flat, axially directed abutment surface surrounding the stud where it joins the head, and
   (c) a stud smooth portion located between the threads and the head with a diameter smaller than that of the threads, and
a load-bearing, stand-off bushing anchored at one end to the first structural member through a bore therein and providing at its distal end a stand-off support upon which the larger diameter abutment surface of the stud head presses after the stud is engaged with the second structural member, said bushing being generally tubular in shape and having
   (a) a flared inner end which grips the inner surface of the first structural member through a bore therein,
   (b) an outwardly extending flange located contiguous the outer surface of the first structural member when the bushing is operatively positioned, said flared inner end and flange gripping the first structural member therebetween,
   (c) a stud head, stand-off annular support portion located at the distal end of said bushing formed by doubling the wall of the bushing inwardly along the axis of the bushing,
   (d) an inwardly directed flange formed from part of the doubled-wall portion located within the bore of the bushing, said flange positioned between the stud threads and the stud head when the stud is operatively positioned within the bushing, and
   (e) means located on the stud having a diameter larger than the bore of the inner flange for retaining the stud in the bushing when the stud is not engaged in the second structural member.

2. The fastener as defined in claim 1 further including a spring mounted on the stud smooth portion between the stud head and the inwardly directed annular flange of the bushing so that when the stud threads are not engaged in the second structural member the stud head is urged axially away from the distal end of the bushing so that the stud threads are drawn within the bushing.

3. The fastener as defined in claim 2 wherein the stud retaining means comprises
a retainer operatively located within the bushing having an outside diameter just smaller than that of the bore of the bushing and having a bore with a diameter approximately that of the small diameter of the stud threads, said retainer being threaded over the stud threads and located on the stud smooth portion adjacent the inwardly directed annular flange of the bushing so that when disengaged with the second structural member further axial movement of the stud in the direction of the stud head away from the distal end of the bushing is prevented when the stud threads press the retainer against the bushing inner flange.

References Cited by the Examiner

UNITED STATES PATENTS

| 598,200 | 2/98 | Gilbert. | |
| 748,078 | 12/03 | Kaisling | 151—69 |
| 1,609,772 | 12/26 | Rank | 151—69 |
| 1,664,820 | 4/28 | Hughes | 151—69 |
| 2,460,613 | 2/49 | Whelan et al. | 151—69 |
| 2,470,927 | 5/49 | Hale | 151—69 |
| 2,831,520 | 4/58 | Clarke | 151—69 |
| 3,126,935 | 3/64 | Tuozzo | 151—69 |

FOREIGN PATENTS

| 558,456 | 6/58 | Canada. |

EDWARD C. ALLEN, *Primary Examiner.*